United States Patent [19]

Wenzinger, Jr.

[11] Patent Number: 5,015,189

[45] Date of Patent: May 14, 1991

[54] TRAINING APPARATUS

[75] Inventor: Wenzinger, Jr., Vestal, N.Y.

[73] Assignee: Doron Precision Systems, Inc., Binghamton, N.Y.

[21] Appl. No.: 424,598

[22] Filed: Oct. 20, 1989

[51] Int. Cl.⁵ ............................................. G09B 9/04
[52] U.S. Cl. ....................................... 434/63; 434/62; 434/69; 273/86 B; 446/7; 446/454; 364/578; 358/87; 358/104
[58] Field of Search ................................... 434/62–71; 273/86 B, 16 A; 446/7, 454; 244/190; 358/87, 104; 364/578

[56] References Cited

U.S. PATENT DOCUMENTS

| | | | |
|---|---|---|---|
| 3,283,418 | 11/1966 | Brewer et al. | 434/69 |
| 3,560,644 | 2/1971 | Petrocelli | 358/87 X |
| 3,581,668 | 6/1971 | Ingels | 446/454 X |
| 3,936,955 | 2/1976 | Gruen et al. | 434/63 |
| 4,817,948 | 4/1989 | Simonelli | 434/71 X |
| 4,846,686 | 7/1989 | Adams | 434/69 |

Primary Examiner—Richard J. Apley
Assistant Examiner—Joe H. Cheng
Attorney, Agent, or Firm—Richard G. Stephens

[57] ABSTRACT

A trainee station in a tractor-trailer training apparatus includes dummy controls simulating those of a tractor, and a display screen visible from the trainee station. At a remote diorama or terrain model a miniature tractor-trailer is moved atop the diorama in accordance with the operation of the trainee's dummy controls. A plurality of video cameras mounted within the cab of the miniature tractor provide video signals which are displayed on the mentioned screen. The fields-of-view of two of the video cameras embrace miniature rearview mirrors on the miniature tractor, providing realistic views of portions of the trailer as trainee operation of the controls moves the minature tractor-trailer about the diorama.

8 Claims, 9 Drawing Sheets

TRAINING APPARATUS invention relates to driver training and testing apparatus for land vehicles, and, more particularly, to improved apparatus for training and testing operators of complex, or heavy, or large vehicles, such as tractor-trailers, buses, and various military vehicles. One object of the present invention is to provide a simulator system which is readily adaptable to simulate operation of a variety of complex, or heavy, or large land vehicles. The invention will be illustrated in connection with simulation of a tractor-trailer but it will become evident that major principles of the invention apply to a variety of other land vehicles.

Thorough training of a tractor-trailer driver involves numerous situations which markedly differ from those encountered in automobile driving. Both starting and stopping may involve factors not encountered in a car. Backing a trailer up to a loading dock looks simple as an expert does it, but it requires much practice by most individuals. Maneuvers such as parallel parking, jack-knife parking, and other maneuvers commonly performed by experienced drivers require large amounts of practice or training time before many individuals can perform such tasks proficiently.

The fifth-wheel, or articulated, connection between a tractor and a trailer considerably complicates the operation of a tractor-trailer combination, requiring much more training or practice in the operation of such a vehicle than what is required for a more common vehicle, such as an ordinary automobile. It is possible to provide some valuable training in tractor-trailer operation by projection of previously-photographed, or "canned", scenes. One such training system is shown in U.S. Pat. No. 4,846,686 recently issued to the assignee of the present invention. It long has been well known, however, that training is much more effective if it is "interactive", i.e., if trainee operation of controls appropriately varies visual cues presented to the trainee. Highly interactive training equipment has been provided to train pilots and astronauts, but at enormous expense. One object of the present invention is to provide economical interactive method and apparatus for training operators of tractor-trailers and other heavy land vehicles.

DESCRIPTION OF THE PRIOR ART

The broad idea of projecting to a trainee at a dummy control station, the video scene viewed by a video camera whose position and attitude were controlled by the trainee, has been old, since the 1950s, or perhaps even earlier. In a 1950's aircraft simulator, a video camera controlled in position and attitude relative to an airport model by trainee (pilot or co-pilot) operation of dummy aircraft controls, transmitted a video picture which was projected for viewing by the trainee pilots. The very large expense of providing training in an actual aircraft justified the high cost of the video system provided for the simulator. To provide useful aircraft landing training, the aircraft simulator required that altitudes be depicted over a very wide range, from several thousand feet down to where the pilot view was only 10 feet above the runway. Provision of an optical system which would accommodate such variation with a practical size of airport model presents a formidable problem. In such systems the scaling or magnification which was used usually required that a lens representing the pilot's view be driven down to an extremely small fraction of an inch above the terrain model, as the simulated aircraft made a landing. Lens damage from collision with the model was often encountered. The use of the large scale-reduction needed also tended to cause unrealistic "jumps" in a visual display if backlash or limited system dynamics were present. The problems associated with such "TV camera-model" visual display systems long ago resulted in departures directed toward other types of visual display systems, such as variable anamorphic motion picture systems, and more recently, computer-generated image displays. Computer-generated image displays are typified by extremely large cost, and very little realistic detail. "Camera-model" systems have had little use for many years.

In accordance with one concept of the present invention, it has been recognized that the most important tasks for which training is required in connection with many land vehicles, do not require large scale-factor magnification changes like those required for aircraft simulation. While the altitude of the pilot's eye may vary from say 6000 feet to 10 feet (i.e., by a ratio of 600) in an aircraft simulation, the present invention recognizes that no such variation is required in a land vehicle trainer, wherein altitude change is either zero or negligible. It also has been recognized that a very large percentage of the procedures which must be repeatedly practiced to master operation of a tractor-trailer, or like vehicle, are, much unlike aircraft procedures, short distance procedures. While a tractor-trailer trainee could benefit to some degree by realistic simulation of a one-mile or two-mile trip down a highway, the tasks which require the most practice are those encountered when the operator must maneuver his tractor-trailer within a relatively small space, such as within a small truck terminal or factory yard. Highway travel in a tractor-trailer mainly involves steering and paying attention to the position of one's vehicle relative to lanes and to the presences of other vehicles. Highway travel in an ordinary automobile involves the same considerations. Because most, if not all, persons being trained to drive tractor-trailers are already trained to operate automobiles, less training in highway travel is required compared to that required in what may be termed "short-distance" maneuvers. The short distance maneuvers mainly involve (a) starting and stopping (b) straight-line backing (c) backing straight toward a dock (d) offset right and offset left backing (e) left and right parallel parking (f) left and right turning during forward travel, (g) left and right turning during backward or reverse travel, (h) backing toward a dock in a narrow passageway, and (i) backing toward a dock not visible to the operator.

In accordance with another important concept of the present invention, the visual display presented to the trainee incorporates interactive detail, which includes views of rearward portions of the simulated vehicle. Aircraft operation seldom, if ever, involves rearward views by a pilot, but conversely, in training operators of tractor-trailers, rearward views often tend to be more important than forward views.

In the present invention, since vehicle altitude need not change appreciably, some important visual information of a type never obtained in prior aircraft simulators can be readily obtained and projected for view by a trainee, at quite reasonable cost.

In accordance with one concept of the present invention, a camera view of portions of a miniature vehicle controlled by a trainee is projected for viewing by the trainee. For example, as a trainee maneuvers a simulated tractor-trailer from his trainee station, he may view the changing scene or scenes which a driver would view generally forwardly through the windshield of a tractor cab, and also view what a driver would view in and around one or two rear-vision mirrors, as similar movements are made with an actual tractor-trailer.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

Figure 1:
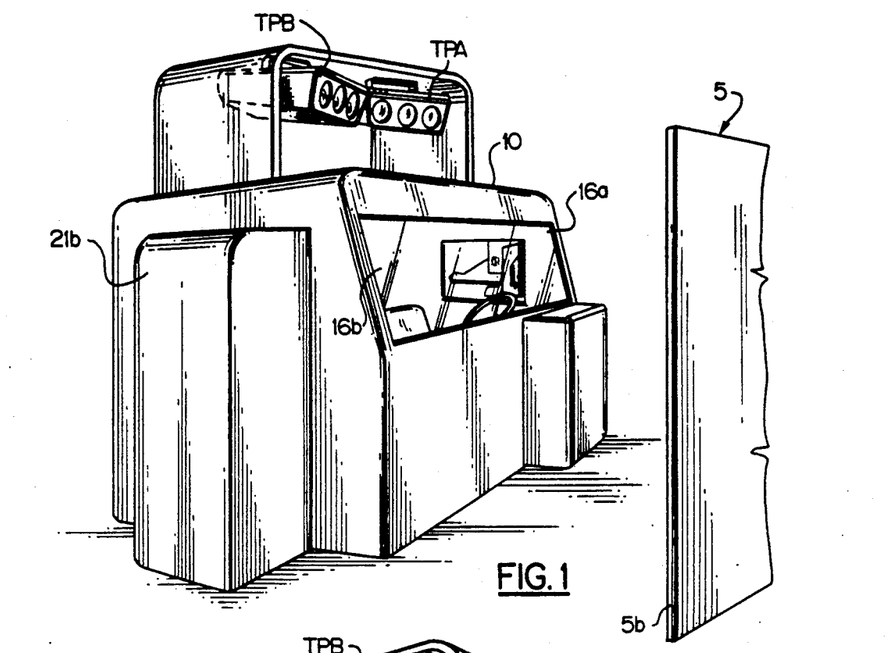
FIG. 1 is a frontal perspective view showing the trainee's station, a screen, and television projector means in one embodiment of the invention.
Figure 2:
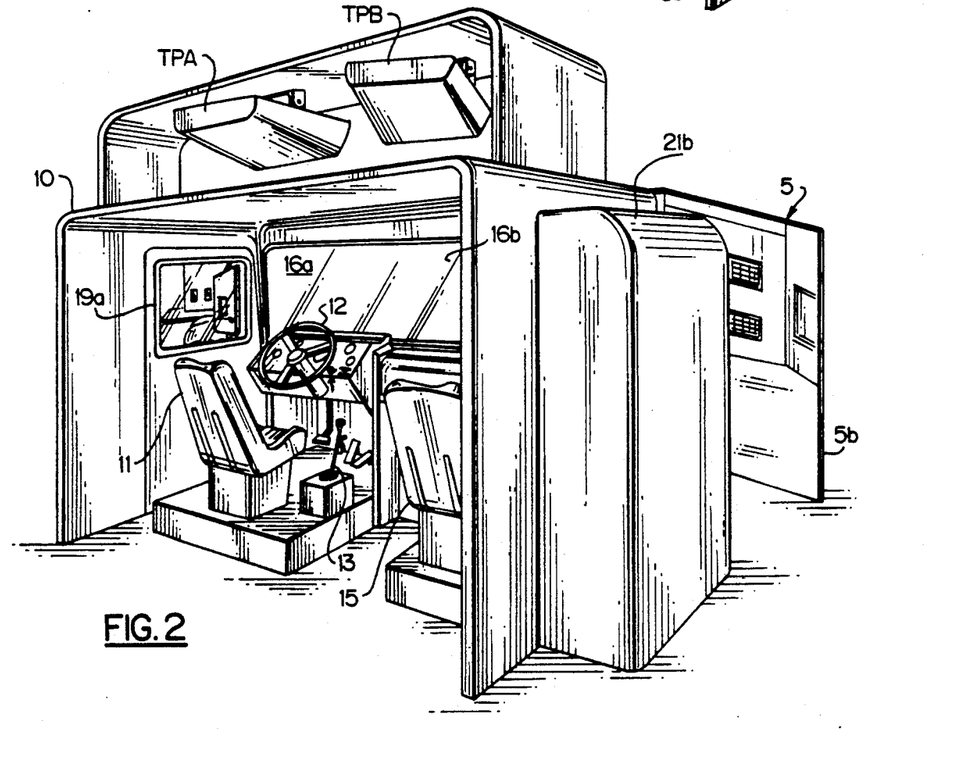
FIG. 2 is a rear perspective view of the apparatus of FIG. 1.

Referring first to FIGS. 1 and 2, the assembly there-shown includes a cab shell 10, the interior of which is fitted to resemble the interior of a typical tractor cab. Within the cab shell are a driver or trainee's station which includes a seat 11, and various dummy controls such as a simulated or dummy steering wheel 12, a dummy gear shift lever 13, and various other dummy controls which are common in driver trainers, such as an accelerator pedal, a brake pedal, and a clutch pedal.

Figure 4:
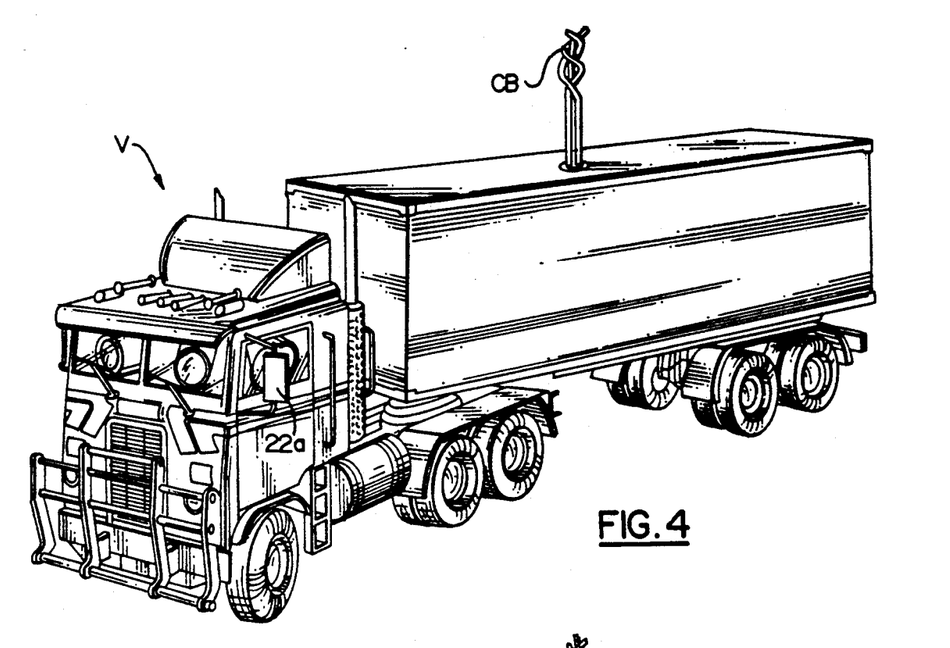
FIG. 4 is a perspective view of one form of miniature tractor-trailer used in one successful embodiment of the invention.
Figure 5:
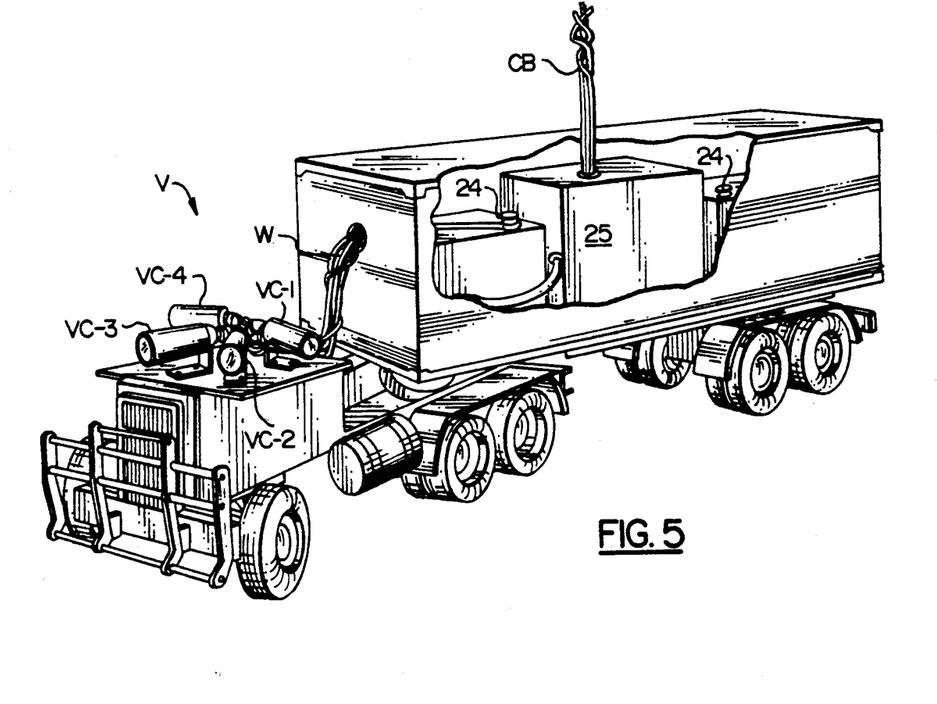
FIG. 5 is a perspective view of the miniature tractor-trailer of FIG. 4 with various parts removed or cut away, to show a plurality of camera heads or lens barrels situated at the driver's point of view in the miniature tractor, and the electronics associated with such lens barrels carried in the miniature tractor portion of FIG. 5.
Figure 15:
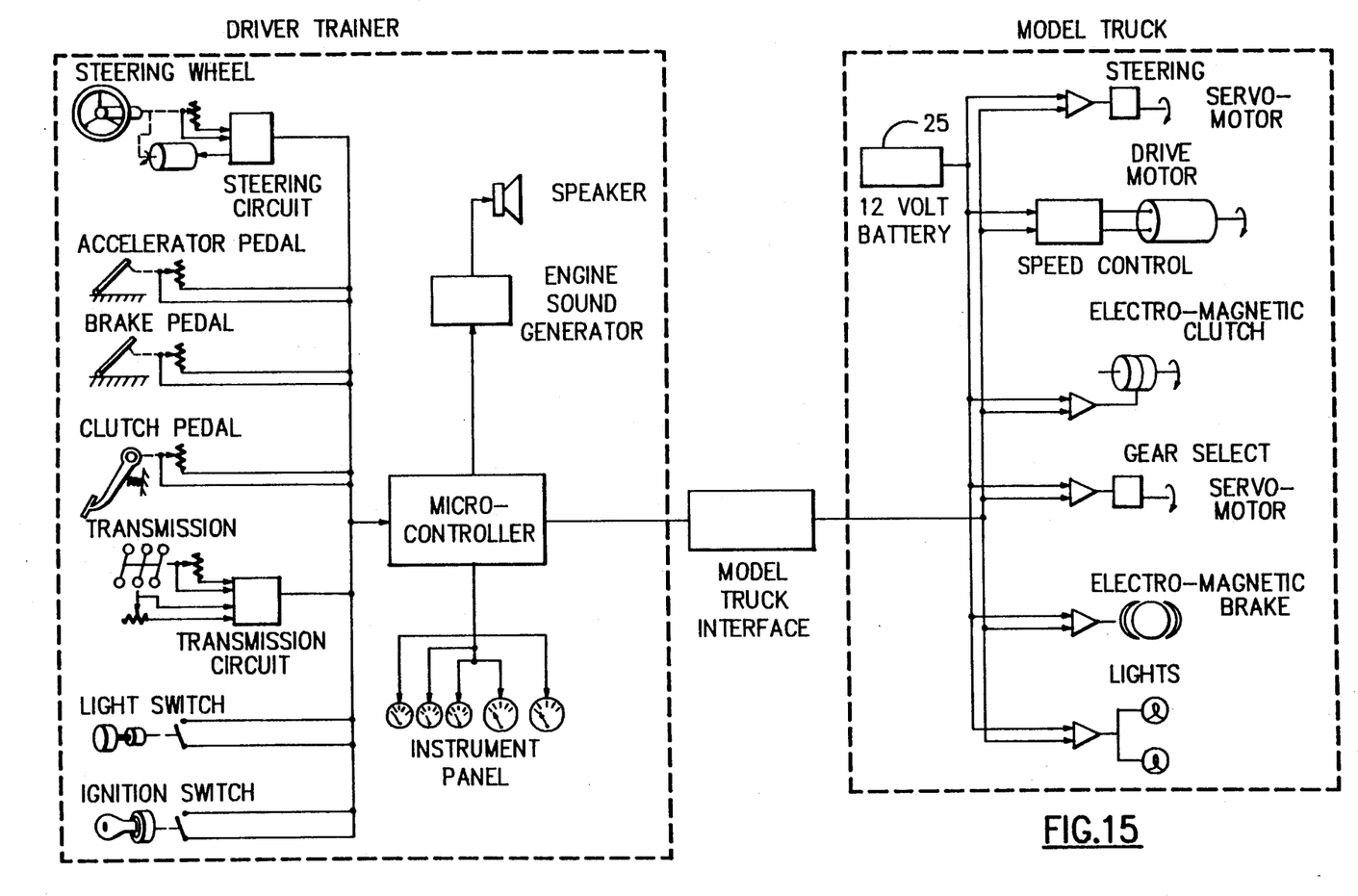
FIG. 15 is a combined electrical schematic-block diagram illustrating the electrical arrangement between a driver trainer portion and a miniature truck portion of the invention.

Gear-shift operation is an important aspect of driving many trucks. A dummy 10-speed manual transmission control, for example, may be included in some embodiments of the invention, or perhaps a 5-speed automatic transmission control, as another example. Further, the cab shell 10 of the invention may desirably include both manual and automatic transmission dummy controls, so that a trainee can gain proficiency with both systems. In addition to the mentioned controls, the trainee station ordinarily will include a variety of dummy switches which correspond to switches of the following types in an actual truck: headlight switch, trailer running-lights switch, engine stop switch, trailer air supply switch, system parking brake, turn signal and flasher switch and ignition switch. The cab also includes a plurality of dummy indicators, such as a speedometer, tachometer, fuel gauge, ammeter, oil pressure gauge, temperature gauge, air pressure gauge, oil pressure light, and various other indicators. In FIG. 2 a second seat 15 is shown provided for occasional use by an instructor. In one embodiment of the invention the trainee station largely resembled an L-225 driver trainer system which has been widely sold by the assignee of the present invention. The dummy controls and dummy indicators are connected to a micro-controller of the driver trainer system. Signals from the driver trainer system operate the dummy indicators within cab shell 10, and signals from the system are routed to control a miniature vehicle V (FIGS. 4,5). FIG. 15 illustrates a known form of driver trainer. Output signals from the microcontroller of the driver trainer are applied via known interface circuitry shown as a simple block to various circuits within the miniature truck V. The interface circuits provided buffering and voltage level-shifting in accordance with techniques well known in the art. In the mentioned embodiment, the steering servo, the traction or drive motor and the gear select servo motor shown all were standard parts of a Wedico toy truck identified below, which is ordinarily radio-controlled. For purposes of the present invention an electromechanical clutch-brake assembly was added to provide clutch and brake functions aboard the miniature vehicle. The clutch-brake assembly comprised a Model UCB-12CC-4-4-12V assembly from Electroid Company of Springfield, N.J. Numerous other techniques for sensing operation of driver trainer operator controls and providing suitable output control signals for dummy indicators and the like are well known in the driver trainer art and are available for use in connection with the present invention. While control signals from the driver trainer system are shown below to be applied to a miniature vehicle V via wires of an overhead cable, it will become evident to those skilled in the art that one or more of those control signals can be communicated to the miniature vehicle via one or more radio links, using a given frequency for a given control, for example, or by multiplexing, so that a given frequency handles data for plural controls.

Using a single radio frequency, serial bits of one or several digital words can be readily sent to the miniature vehicle, detected there and used to control the vehicle. Techniques required for such serial transmission are widely used to send data to serial printers used with personal computers. Bytes or words transmitted to the miniature vehicle may control groups of boolean (on-off) functions, or single functions, such as a motor speed, as will be readily evident to those skilled in the art.

Figure 3A:
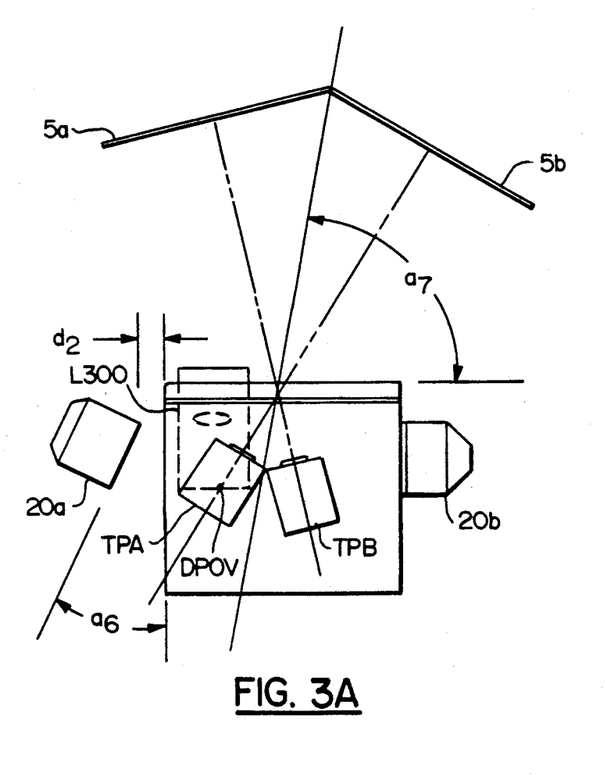
FIG. 3a is a plan view of the trainee's station.

The front of cab shell 10 is shown containing an open window space 16 simulating a windshield. During operation of the invention, a trainee seated in seat 11 operates the mentioned dummy controls, at times viewing a forward scene through simulated windshield opening 16, and at times viewing sidewardly and/or rearwardly. The forward scene viewed by the trainee is projected onto screen 5 by television projectors shown at TPA and TPB. In addition to the simulated central or forward view visible on screen S through windshield opening 16, the trainee may view a left-side display located at window 19a (FIG. 2), and a generally similar right side display 19b not visible in FIGS. 1 and 2. The displays 19a, 19b are produced by video monitors (20a, 20b, FIG. 3a) located within housings 21a, 21b in FIGS. 1-2, housing 21a not being visible in FIGS. 1 and 2. The displays 19a, 19b correspond generally to what a driver might see through left-side and right-side windows of the cab of a tractor, and importantly, those displays include varying rearview mirror or rearview reflector displays. In the plan view of FIG. 3a screen S is shown as an angled screen having two sections 5a, 5b onto which the two video projectors TPA, TPB respectively perpendicularly project. The trainee's point-of-view is shown at DPOV. In the mentioned embodiment each screen section was approximately 80 in. (203 cm.) wide and situated approximately 106 in. (269 cm.) from the simulated windshield of shell 10 and about 132.6 in. (337 cm.) from its associated projector; and projectors TPA and TPB each comprised a SONY Model VPH-1041Q/1041QM color video projector. The monitors 20a, 20b may comprise, for example, 25-inch (63.5 cm.) Panasonic color television monitors Model No. CTL-25805 widely sold throughout the United States. While two projectors are shown used in FIGS. 1-12 to produce the forward views, it should be recognized that one projector, or perhaps three (or more) projectors could instead be used, with an appropriate number of associated cameras being used, of course, in each case.

The video signals required to produce the four displays for windows 16a, 16b, 19a and 19b are provided by four video cameras VC-1 to VC-4 (FIGS. 5 and 6) carried within the cab portion of a miniature vehicle V.

The exemplary miniature vehicle V depicted in FIGS. 4 and 5 and used in the mentioned embodiment of the invention includes a Model 362 3-axle chassis, a Model 205 "FREIGHTLINER" (trademark) cab, and Model 010 trailer, all available from Wedico Technik GmbH, Wuppertal, West Germany. Those mentioned model components are constructed on a scale of 1:16 compared to their real-life full-size counterparts, and the same scale factor is used in construction of the diorama or terrain model to be described. A wide variety of electrically-controlled and electrically-driven model vehicles of different types are available from Wedico, with many of them intended to be used as radio-controlled toys. It will be apparent that many other types of electrically-driven model vehicles may be made in order to provide realistic training in the operation of many other vehicles.

The mentioned scale factor of 1:16 is by no means crucial in the present invention. It should be noted, however, that use of a scale change which is much, much less than that used in aircraft camera-model systems allows one to provide much more realistic displays at much less expense.

The lens barrels or camera heads and charge-coupled sensor portions of four video cameras VC-1 to VC-4 are located with the cab portion of miniature vehicle V, each camera pointing in a different direction. The field-of-view of camera VC-1 includes a front-surfaced miniature rearview mirror or reflector 22a added to and carried on the tractor of vehicle V, and the field-of-view of camera VC-4 includes a similar rearview mirror or reflector 22b not visible in FIG. 4. One suitable form of camera is the Model GP-CD1 industrial color CCD camera available from Panasonic Industrial Company, Secaucus, N.J. Such video cameras comprise a camera head only 0.67 in. (17 mm.) in diameter and only 1.87 in. (48 mm.) in length, with cabling to a nearby (less than 2 meters) camera control unit, having dimensions of 5,38 in. (138 mm.) by 1.65 in. (44 mm.) by 6.63 in. (169 mm.). In the miniature vehicle of FIGS. 4 and 5, the four small camera heads VC-1 to VC-4 are situated within the miniature cab portion, but the four camera control units are carried within the miniature trailer portion of vehicle V at 24 with the camera heads being connected to respective camera control units via wiring shown at W in FIG. 5. The small size of the camera heads contributes significantly to use of a small miniature vehicle and small terrain model, and hence to economy. The trailer portion of vehicle V also includes a battery 25 used to power the video cameras as well as the motors and other electrical equipment aboard miniature vehicle V. In the mentioned embodiment battery 25 comprised a conventional lead-acid motorcycle battery.

In FIGS. 4 and 5 cabling CB is shown extending vertically from the trailer portion of vehicle V. The cabling routes control signals from the driver trainer system to control motors, switches, and lights aboard the miniature vehicle, and routes video signals from the four video cameras back to the video projectors and monitors. Means training cabling CB must keep the cabling trained generally upwardly, so that the cabling does not appear within the fields-of-view of cameras VC-1 and VC-4, but vehicle V must be allowed to move within the confines of the terrain model. A variety of techniques for appropriately training the cable are readily available. A pair of X,Y carriages can be moved in cartesian coordinates to maintain a length of cabling substantially directly above the trailer portion of vehicle V, or a rotating arm having a radially moving carriage can instead provide the same function in polar coordinate fashion, such arrangements being discussed below in connection with FIGS. 13 and 14.

Figure 3B:
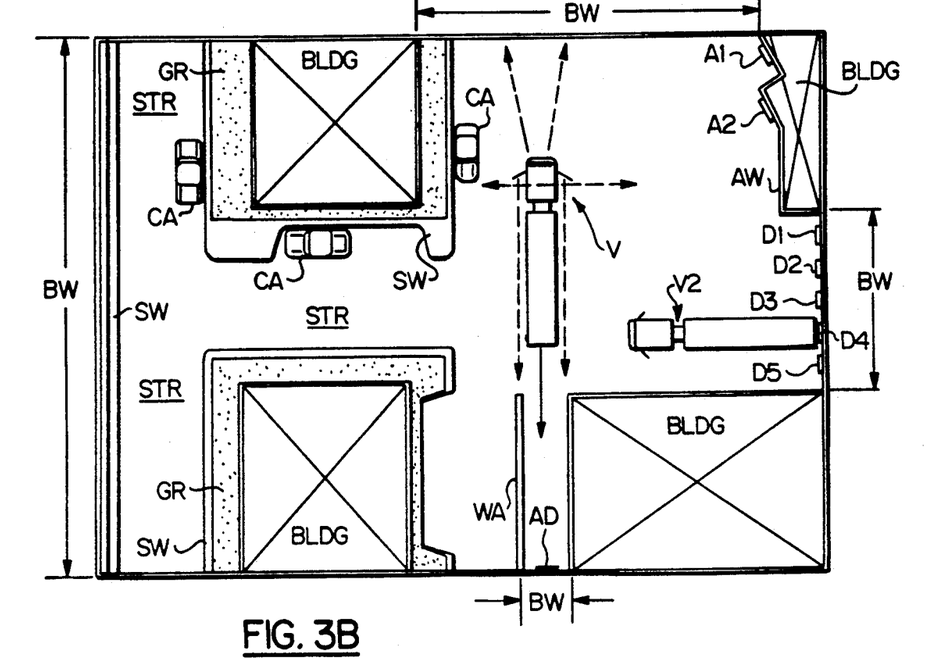
FIG. 3b is a plan view of one form of diorama, or terrain model.

The plan view of FIG. 3b depicts one exemplary form of diorama or terrain model. The same exemplary form of terrain model is depicted isometrically in FIG. 9, with the miniature tractor-trailer V situated in a different position.

The exemplary model of FIG. 3b measured 228 by 180 inches (5.79 by 4.57 meters) and was constructed atop plywood boards. With a 1:16 scale factor it simulated a space which is 304 ft. by 204 ft. (92.66 by 73.15 meters). Strip areas labelled SW in FIG. 3b represent sidewalks, stippled areas labelled GR represent grass area, areas labelled STR represent street area, and areas labelled BLDG represent buildings, and lengths of walls labelled BW represent building walls. The heights of the simulated building walls need not exceed, of course, the portions which may be seen by a trainee in any of the views depicted by projectors TPA, TPB and monitors 20a, 20b.

A plurality of model cars CA,CA are shown located atop the model, as is the miniature vehicle V controlled by the trainee, and a second scale-model vehicle V2 not controlled by the trainee. The model cars CA and model trucks such as V2 may be readily varied in number and/or manually moved around atop the model to increase the difficulty of various driving tasks as a trainee gains proficiency. Model truck V2 may be arranged to be controlled remotely by an instructor, ordinarily to provide very simple motion of model vehicle V2. If vehicle V2 is caused to move in a direction which might cause a collision with vehicle V, the trainee controlling vehicle V can be given valuable practice in how to avert collisions.

A scale-model wall WA extending parallel to one of the simulated buildings provides what is often called an "alley dock" at AD, creating a situation in which an operator must back his tractor-trailer through a very narrow space to spot the rear end of the trailer adjacent dock AD, without scraping the trailer against wall WA or the building, and without ramming the trailer into dock AD at undue speed. A second wall AW is shown angled to provide two angled loading docks A1,A2, and a plurality of parallel loading docks are simulated at D1 to D5. While the diorama is shown for sake of simplicity as having only level spaces through which vehicle V may move, it should become evident that some inclined simulated alleyways and driveways may be readily included to allow trainees to gain proficiency in such common tasks as having to back down an incline toward a dock, or to provide training in starting and stopping on an incline.

The diorama or terrain model ordinarily will be flooded with a large amount of overhead light to facilitate simulation of daytime driving conditions, but the amount of overhead lighting preferably will be controllable by an instructor, so that trainees may view dusk or night-time maneuvering problems as well as daytime problems.

Further, the loading dock structure and like model structure associated with the terrain model may include various features controllable by the instructor which provide significant training. For example, dummy lights on the diorama terrain model normally intended to aid the trainee as he attempts to back up to a loading dock may be obscured by additional lighting which greatly increases the difficulty of the trainee driver's task.

Figure 6:
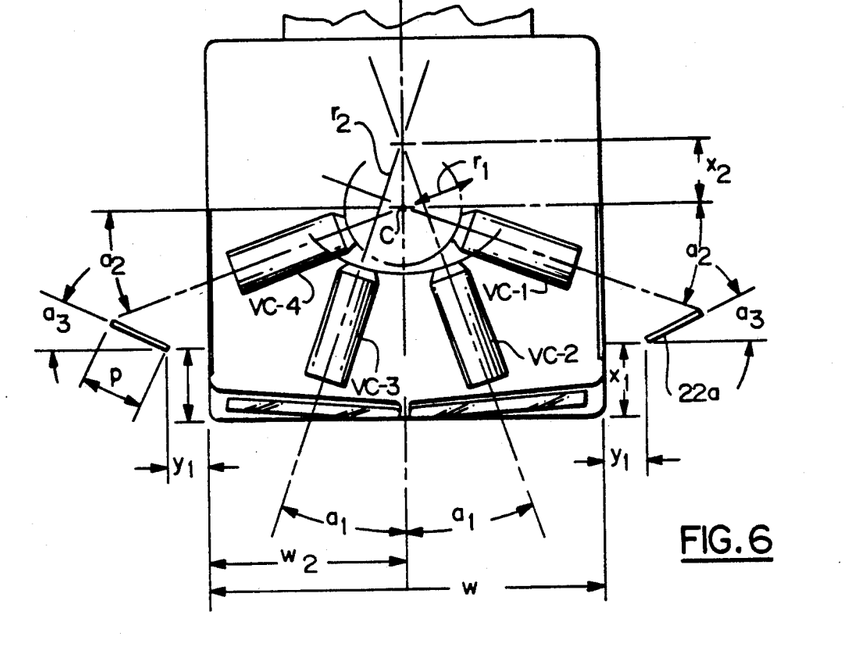
FIGS. 6, 7 and 8 are respectively plan, front elevation, and side elevation diagrams illustrating a preferred video camera arrangement for the embodiment depicted in FIGS. 1–12.
Figure 7:
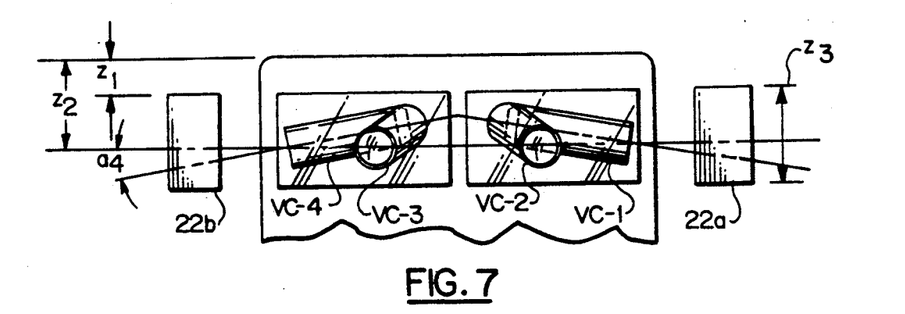
Figure 8:
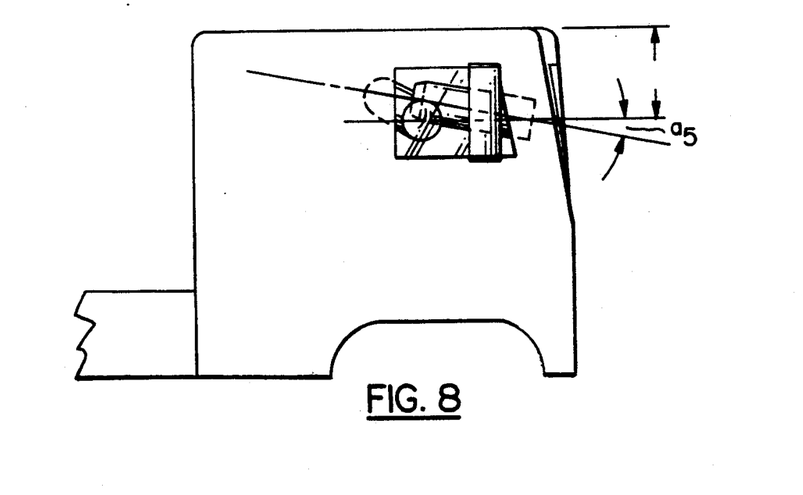

The manner in which the four video cameras are aimed relative to the trainee eye position and the miniature rearview mirrors in the miniature vehicle in the mentioned exemplary embodiment is shown in the plan, front elevation and side elevation views of FIGS. 6, 7 and 8. The angles and other dimensions depicted in those drawing figures will vary, of course, in various embodiments of the invention. In the mentioned successful embodiment, dimensions were as follows:

| | | |
|---|---|---|
| Miniature cab width $w$ | 6.125 in. | 15.56 cm. |
| Control camera angles $a_1$ | 24 degrees | |
| Outside camera angles $a_2$ | 21 degrees | |
| Monitor angle $a_6$ | 22 degrees | |
| Distance $d_2$ | 10 inches | |
| Projection system angle $a_7$ | 78 degrees | |
| Mirror angles $a_3$ | 30 degrees | |
| Mirror widths $k$ | 0.90 in. | (2.25 cm.) |
| Mirror longitudinal position $x_1$ | 1.20 in. | (3.05 cm.) |
| Displacement $x_2$ | 0 to 1.00 in. | (2.54 cm.) |
| Mirror lateral position $y_1$ | 0.65 in. | (1.65 cm.) |
| Radius $r_1$ | 0.90 in. | (2.54 cm.) |
| Radius $r_2$ | 1.10 in. | (5.21 cm.) |
| Mirror vertical position $z_1$ | 0.50 in. | (1.27 cm.) |
| Camera vertical position $z_2$ | 1.20 in. | (3.56 cm.) |
| Angle $a_4$ | 10 degrees | |
| Angle $a_5$ | 10 degrees | |
| Mirror length $z_3$ | 1.5 in. | |

In one simplest mode of the invention, the model is brightly lighted from above, generally uniformly, to provide a display resembling that seen on a bright overcast day. Lighting may be diminished to simulate diminished visibility conditions.

Some important features of the present invention may be better appreciated by considering, together, FIGS. 9, 10, 11, 11a, 11b, 12, 12a and 12b, all of which figures are co-ordinated, as is FIG. 3b.

Figure 9:
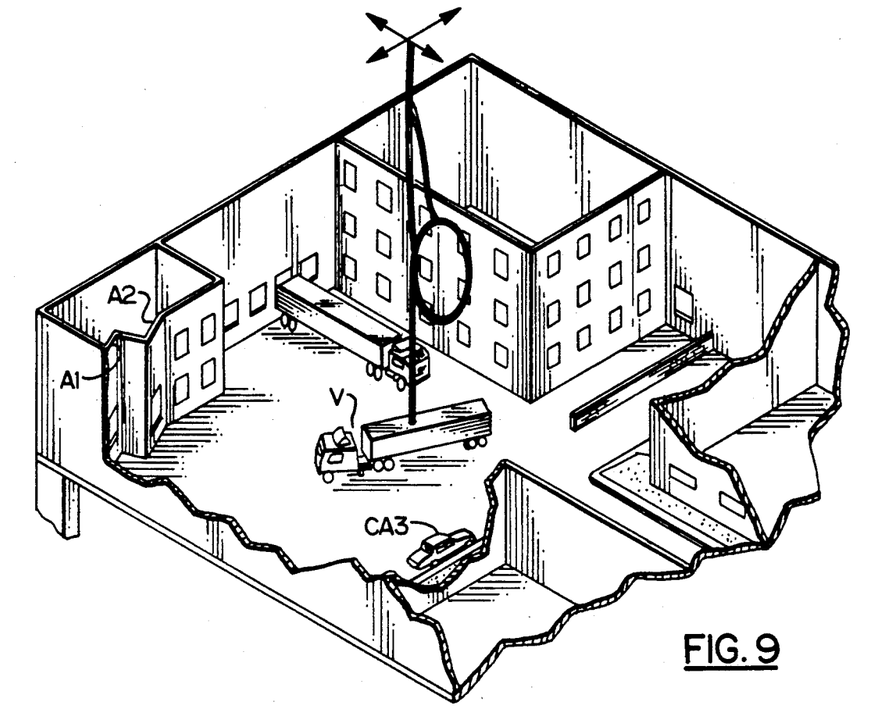
FIG. 9 is a perspective view showing one form of diorama or terrain model according to the invention, with a miniature tractor-trailer ensconced thereon.
Figure 10:
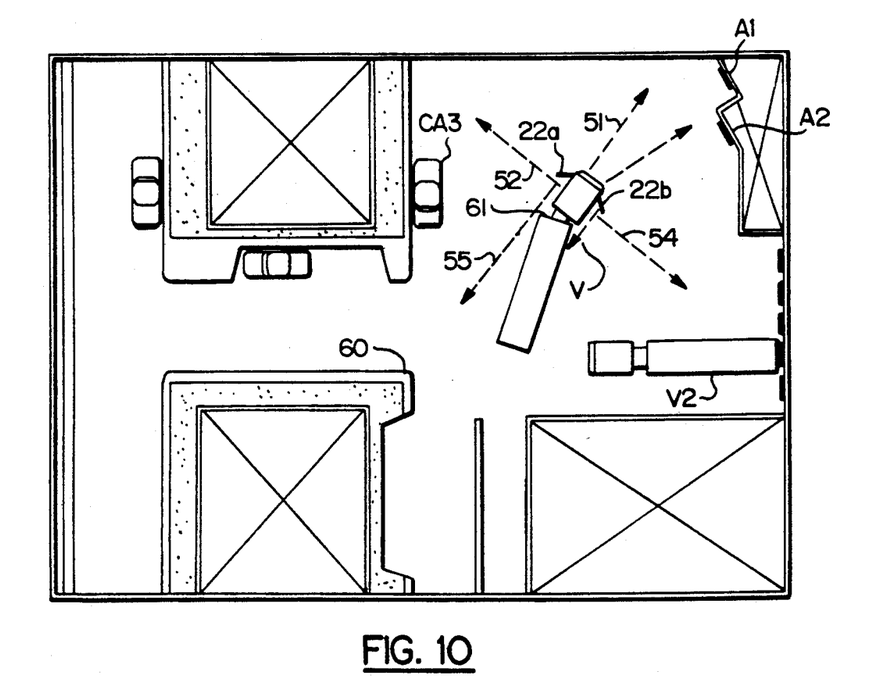
FIG. 10 is a plan view of the apparatus of FIG. 9.
Figure 11:
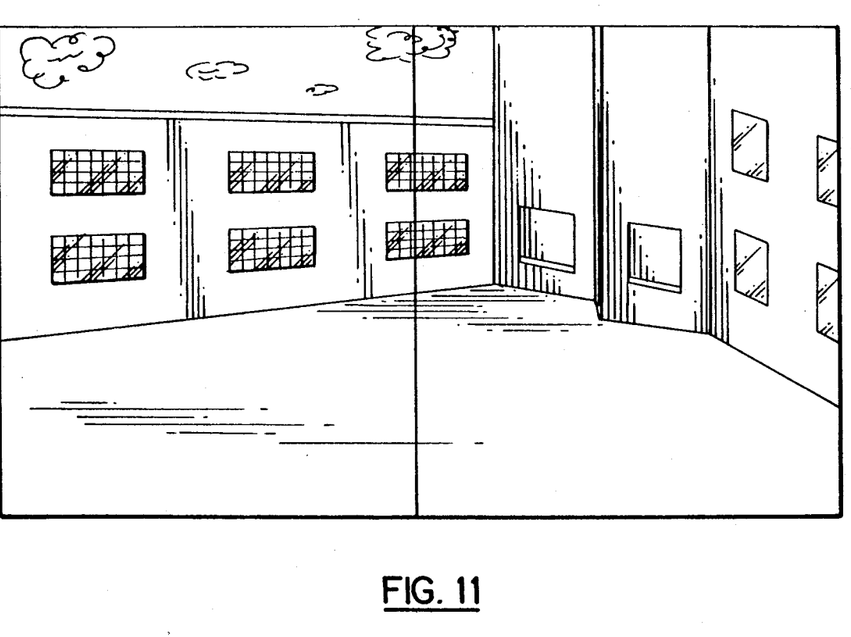
FIGS. 11, 11a, and 11b depict front windshield, left window, and right window views, respectively, seen by the trainee while the tractor-trailer is at a turned condition, such as that seen in FIG. 10.
Figure 11A:
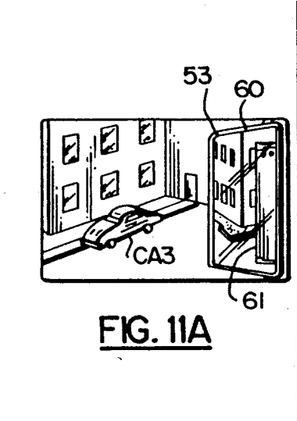
Figure 11B:
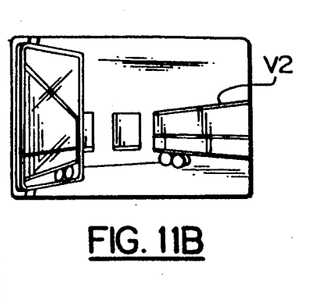
Figure 12:
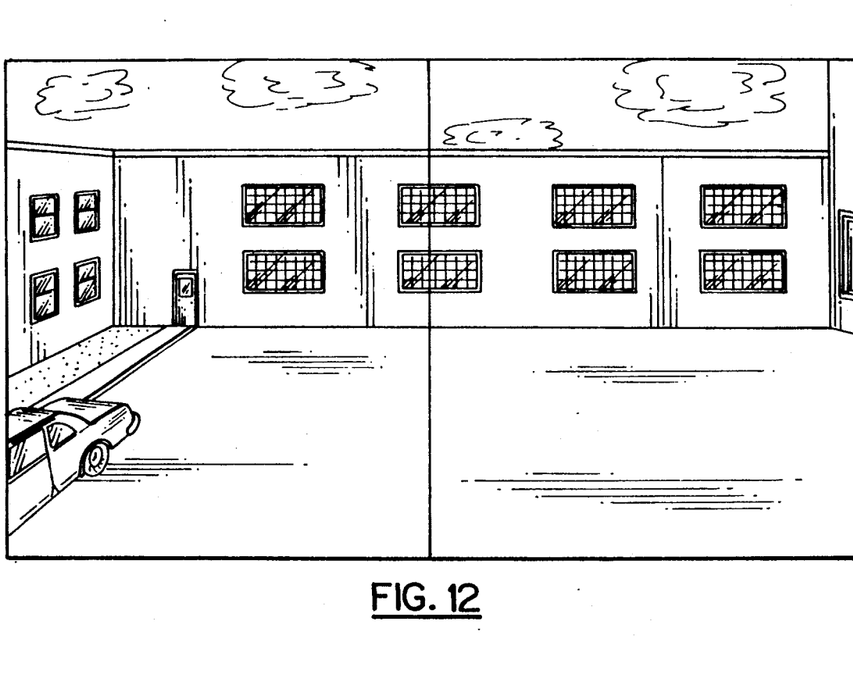
FIGS. 12, 12a and 12b depict front windshield, left window, and right window views, respectively, while the tractor-trailer is in a "straight-ahead" condition, such as that shown in FIG. 3b.
Figure 12A:
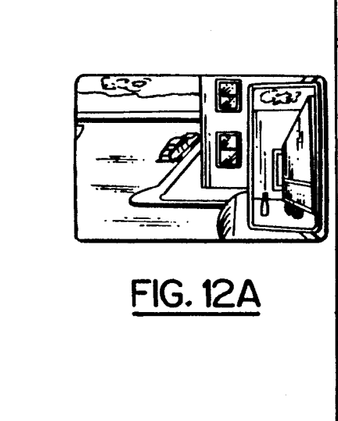
Figure 12B:
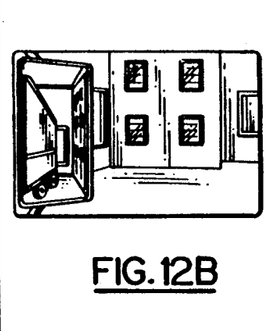

In FIGS. 9 and 10 the cab of vehicle V is shown so that a straight-ahead forward view (lines 51 in FIG. 10) from the cab is directed slightly to the left of angled loading docks A1,A2. A leftside view along line 52 will encompass not only stationary diorama objects, such as the model car CA3 shown in FIGS. 9, 10 and 11a, but also matter displayed in the leftside rearview mirror, as indicated at 53 in FIG. 11a. The view seen at 53 is taken, of course, along line 55 in FIG. 10. It includes a building corner CO (FIGS. 10 and 11a), and a front leftside corner portion of the trailer of vehicle V at 61. A rightside view along line 54 in FIG. 10 will encompass not only some parallel loading docks (of the group D1 to D5), but also part of parked vehicle V2, as shown in FIG. 11b. It is important to note that the leftside and rightside views in FIGS. 11a and 11b show much different amounts of the trailer portion of vehicle V, the clockwise (in FIG. 10) orientation of the cab relative to the centerline of the trailer resulting in much more trailer being visible in FIG. 11b than what is visible in FIG. 11a.

In FIG. 3b the cab of vehicle V is shown aligned "straightahead" with the trailer. The left and right monitor (or sidewindow) views presented to the trainee depict much different views, as can be seen by comparing the leftside view of FIG. 12a with the rightside view of FIG. 12b; however, and what is crucial to a trained tractor-trailer operator, the amount of trailer visible in the rearview mirror of FIG. 12a equals the amount of trailer visible in the rearview mirror of FIGS. 12b, irrespective of what surrounds those rearview displays. The operator often must gauge his steering solely on the differences or similarities between those two rearview displays. However, at the same time, he must also carefully note the visual data outside of and surrounding the rearview displays. Keeping the cab aligned with the trailer does little good if either of them runs into a forbidden area. Most tractor-trailer maneuvering involves a combined association of forward or sidewise views with the two rearward mirror views, and provision of interactive simulation of that combination is believed to be an outstanding novel and important feature of the present invention.

Some very important visual cues which are practically impossible to provide (or extremely expensive to provide) in prior visual display systems are readily provided by the apparatus of the present invention. As one example, as a tractor-trailer driver backs up toward a building or other structure, the movement of a shadow which his trailer casts on a building wall may indicate the progress of the trailer toward the building, perhaps aiding the driver. On the other hand, a shadow may tend to obscure a trailer edge which the driver should be carefully monitoring, making the maneuver more difficult. One further feature of the invention is that shadowing effects which occur in the real world may be simulated very realistically and economically.

The controls at the trainee station may include one or several light switches, so that the trainee may turn on headlights on vehicle V, and turn on trailer lights on vehicle V. Observing, via rearview mirrors, the patterns cast by trailer lights on walls or loading docks as one backs a tractor-trailer may be the only practical way of backing a tractor-trailer at night. Brake lights ordinarily will illuminate when the driver presses the brake pedal. The reflection of such lights from a loading dock as viewed through a rearview mirror, can be an important visual cue as a driver backs the vehicle toward the simulated loading dock.

The cabling CB is shown extending upwardly from the miniature trailer VT, so that it can never be viewed by any video camera via a rearview mirror, and it extends with some slack, so that the cable does not impede movement of miniature vehicle V. The cabling ordinarily will include four or so coaxial cables connected with respective ones of the video cameras, and a varying number of control wires. The control wires are connected to stop, start and run the vehicle drive motor, to operate the clutch, steering wheel and brake. In some embodiments of the invention, control wires may be provided to illuminate miniature headlights and running lights on vehicle V.

Figure 13:
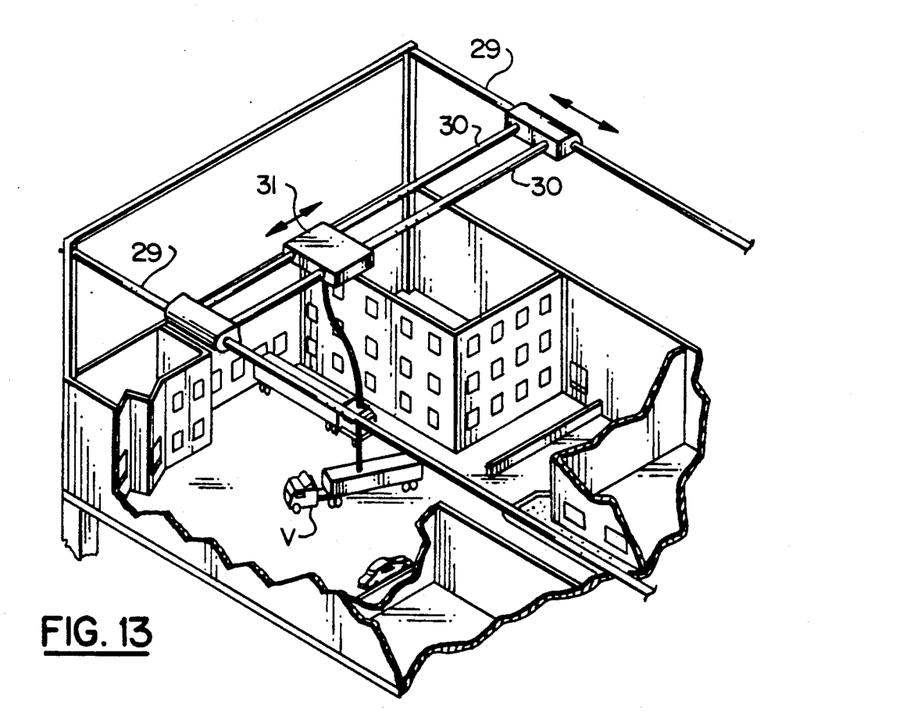
FIGS. 13 and 14 are perspective views illustrating two ways in which cabling associated with the invention may be trained in some embodiments of the invention.
Figure 14:
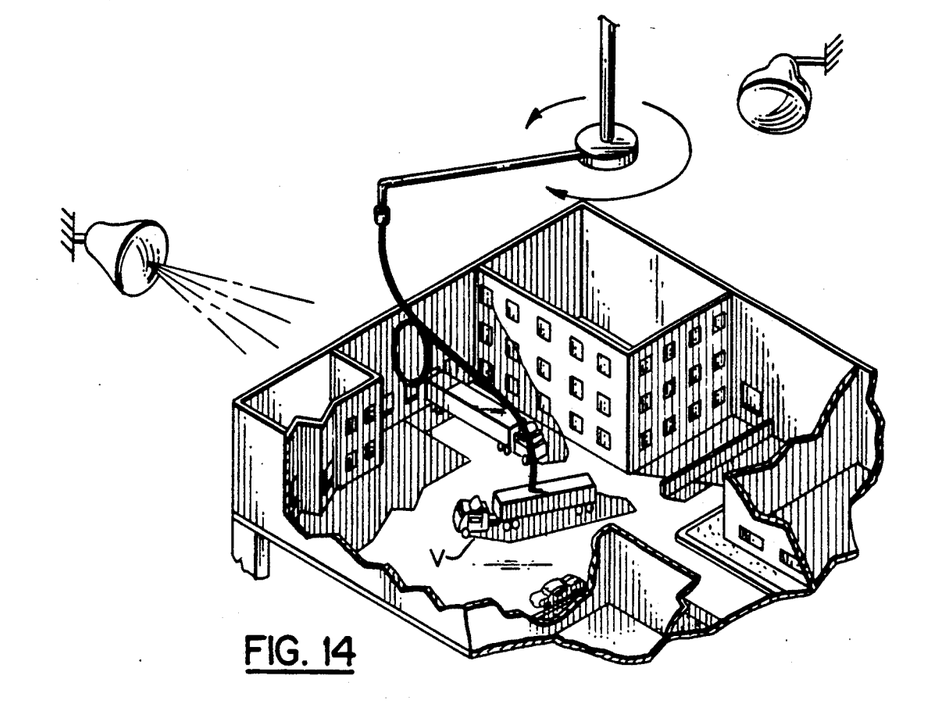

If the headroom available above the diorama terrain model is sufficiently great in relation to the length and width of the terrain model, cabling CB can extend down to vehicle V from a fixed overhead location with a bit of slack and allow vehicle movement over all of the terrain model. In some applications, as where little headroom is available above the terrain model, cabling CB may be routed to vehicle V using a technique such as that shown in FIG. 13, or alternatively, that shown in FIG. 14. In FIG. 13 a frame 28 supported above the terrain model includes slide bars 29,29 which slidingly support a carriage for movement in one direction of a cartesian coordinate system. The carriage includes slide bars which slidingly support a second carriage 31 for movement in a second, perpendicular, direction. Training the cable between carriage 31 and the projectors can be done in a variety of ways which will be evident to those skilled in the art. In FIG. 14 a rotatable arm supporting cabling CB is rotated by pulling on the cabling from vehicle V as the vehicle maneuvers to different locations on the terrain model. It is contemplated that movement of an overhead cable support ordinarily will be caused solely by pulls which vehicle V applies to the cabling as it moves to different locations on the diorama. If some embodiment of the invention should incorporate a diorama of great dimensions, movement of an overhead cable support can be readily provided by driving the support to a computed position directly above the trailer of vehicle V. The position of the trailer may be readily tracked using very simple computer techniques which will be readily evident to those skilled in the art.

In FIG. 14 two light sources are diagrammatically shown at LS1 and LS2. Source LS1 projects light largely downwardly, largely perpendicularly to the ground plane of the terrain model. While source LS1 is depicted as resembling an incandescent source, a source which comprised a bank of fluorescent lamp strips extending over the entire terrain model has been preferred in practice.

Lamp LS2 in FIG. 14 is shown projecting light generally downwardly toward the model, but at a considerable slant. With such an arrangement miniature vehicle V will cast shadows on various nearby objects, such as walls and loading docks. These shadows which would be visible to a driver from an actual tractor cab via a mirror will be visible to the trainee. In some cases such shadows help the driver maneuver his vehicle, while in other cases they obscure his view. In either case it is helpful for a driver to gain experience under such conditions.

The light source or sources used to illuminate the terrain model are preferably arranged to be readily varied in intensity, which will allow truck travel to be simulated under varying degrees of lighting ranging from a bright overcast condition to a very dim dusk or night-time condition.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. Training apparatus, comprising, in combination:
 a trainee station having a plurality of dummy controls simulating those of a land vehicle and operable to derive control signals;
 a diorama;
 a miniature vehicle supported atop said diorama, said miniature vehicle having a simulated tractor portion and a simulated trailer portion pivotally connected to said tractor portion for limited rotation about a substantially vertical axis, and miniature leftside and rightside rearview mirrors;
 means responsive to said control signals for controlling movement of said miniature vehicle atop said diorama;
 video camera means comprising a plurality of video cameras situated within said miniature vehicle and operative to derive video image signals depicting separate forward, leftside window and rightside window views of said diorama from within said miniature vehicle;
 a screen spaced forwardly from said trainee station;
 means responsive to the video image signals depicting said forward view for providing a forward view display upon said screen;
 and direct-view video monitors responsive respectively to the video image signals depicting said leftside window and said rightside window views for providing leftside window and rightside window displays and said leftside and rightside rearview mirrors, respectively, at said trainee station.

2. Apparatus according to claim 1 wherein said diorama comprises a three-dimensional scale model having simulated structural features selected from the group comprising building walls, curbs, and loading docks.

3. Apparatus according to claim 1 wherein said miniature vehicle includes headlights, and said dummy controls further include a control operative to turn on and turn off said headlights.

4. Apparatus according to claim 1 further having light source means directed to provide shadows on said diorama.

5. Apparatus according to claim 1 wherein said plurality of video cameras disposed in said miniature vehicle in an arcuate array about a selected point.

6. Apparatus according to claim 1 having cabling extending upwardly from said miniature vehicle outside the fields-of-view of said video camera to connect video signals from said video cameras to said direct-view means for providing a forward view display, and said video monitors and to connect control signals between said trainee station and said miniature vehicle.

7. Apparatus according to claim 1 wherein each of said video cameras comprises a lens section and a circuit card, the lens sections of said video cameras being mounted within said tractor portion, and the circuit cards of said video cameras being mounted within said trailer portion of said miniature vehicle.

8. Apparatus according to claim 1 wherein said video cameras for providing said leftside and rightside displays are mounted within said simulated tractor portion and aimed toward respective ones of said rearview mirrors, whereby differing amounts of opposite sides of said trailer portion appear in said window displays as said trailer portion pivots relative to said tractor portion.

* * * * *